(No Model.)
P. A. OLIVER.
GUNPOWDER MILL ROLL.
No. 375,889. Patented Jan. 3, 1888.
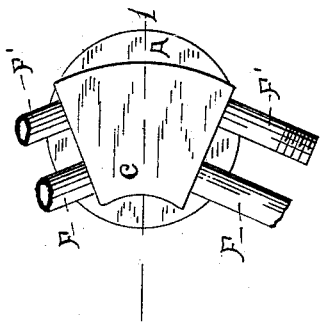
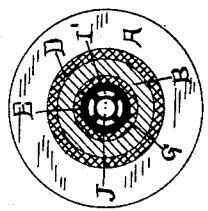
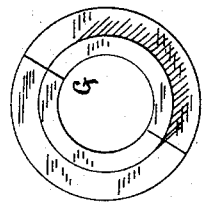
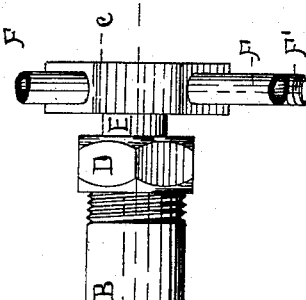
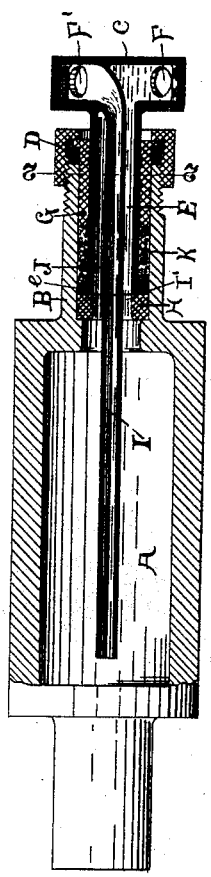
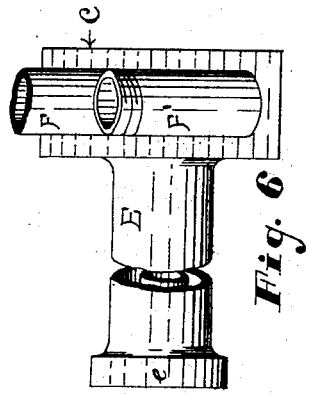
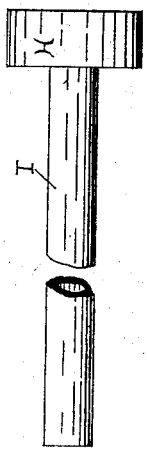
WITNESSES:
Geo. Gunn
W. D. Porter.
INVENTOR
Paul A. Oliver.
BY
Herbert W. T. Jenner,
ATTORNEY

UNITED STATES PATENT OFFICE.

PAUL AMBROSE OLIVER, OF OLIVER'S MILLS, PENNSYLVANIA.

GUNPOWDER-MILL ROLL.

SPECIFICATION forming part of Letters Patent No. 375,889, dated January 3, 1888.

Application filed June 14, 1887. Serial No. 241,267. (No model.)

*To all whom it may concern:*

Be it known that I, PAUL AMBROSE OLIVER, a citizen of the United States, residing at Oliver's Mills, in the county of Luzerne and State of Pennsylvania, have invented certain new and useful Improvements in Gunpowder-Mill Rolls; and I do hereby declare the following to be a full, clear, and exact description of the invention, such as will enable others skilled in the art to which it appertains to make and use the same.

This invention relates to mill-rolls used in the manufacture of gunpowder; and it consists in the novel construction and combination of parts, hereinafter fully described and claimed.

It is desirable that gunpowder-mill rolls shall be kept very cool on account of the inflammable nature of the materials they operate on. They are therefore made hollow and are supplied with special appliances for keeping a constant supply of cold fluid—such as water—circulating through them.

In the drawings, Figure 1 is a side view of a gunpowder-mill roll constructed according to this invention. Fig. 2 is an end view of the same. Fig. 3 is a longitudinal section through the roll, taken on the line 1 1 in Fig. 1. Fig. 4 is a cross-section through the screwed end of the roll-journal, taken on the line 2 2 in Fig. 3. Fig. 5 is a detail side view of the internal pipe. Fig. 6 is a detail side view of the stationary supply-pipe and casing, and Fig. 7 is a detail end view of the gland.

A is the roll, provided with journals, one of which is hollow and marked B. The roll itself is hollow and is provided with an internal pipe, I, which extends from the hollow journal B nearly to the solid end of the roll. The water or other fluid is forced through the internal pipe, I, passes over the entire internal surface of the roll, and out through the openings I' around the pipe, and between it and the journal B. The pipe I may be cast integral with the roll; but it is preferably formed separate, and is provided with a head, H, through which the said openings I' are formed. The head H is driven tightly into the hollow journal or otherwise firmly secured in it, as shown in Fig. 3, thereby supporting the pipe I centrally within the roll. The head H is formed integral with the pipe I and has the openings I' formed through it around the outside of the said pipe and parallel with it. The said pipe I and the roll always revolve together whether the head H is formed integral with the roll or forced tightly into it.

C is a stationary casing outside the roll, provided with the inlet-pipes F' and outlet-pipes F for the water. One each of these pipes is all that is necessary to supply the roll; but they are provided in duplicate in order that several rolls may be connected together in a series, as shown in the gunpowder-mill for which an application for Letters Patent was filed June 14, 1887, Serial No. 241,269.

J is a pipe which projects from the casing and communicates with both of the pipes F', one end of it being enlarged and dividing the casing into two separate parts.

E is a pipe concentric with and inclosing the pipe J. This pipe E also projects from the casing, and it communicates with the pipes F. The pipe E is provided with the collar *e* at one end, and both the pipes E and J are placed within the hollow journal B, so that the pipe J communicates with the pipe I, and the pipe E with the openings I'.

K is packing material placed within the hollow journal around the pipe E.

G is a gland formed in halves longitudinally and forced down upon the said packing by means of the cap D, which engages with a screw-thread upon the outside of the end of the journal. The gland is formed in halves to enable it to be placed upon the pipe E behind the collar *e*. The screw-cap D fills the double office of making the packing water-tight around pipe E and keeping the ends of the pipes E and J in contact with the head H and pipe I, so that there will be no material escape of fluid at their junction.

The casing, with its pipes, remains stationary, and the roll, with pipe I and the gland and screw-cap, revolves.

What I claim is—

1. The combination, with a hollow roll provided with a hollow journal, an internal pipe extending within the roll, and openings connecting the hollow journal with the interior of the roll around the pipe, of two stationary concentric pipes inserted within the said hollow journal and communicating with the said internal pipe and the openings, respectively.

2. The combination, with a hollow roll provided with a hollow journal, an internal pipe extending within the roll, and openings connecting the hollow journal with the interior of the roll around the pipe, of a stationary casing provided with inlet and outlet pipes and with two concentric pipes inserted within the hollow journal, thereby connecting the said inlet and outlet pipes with the said internal pipe and the openings, respectively.

3. The combination, with a hollow roll provided with a hollow journal, an internal pipe extending within the roll, and openings connecting the hollow journal with the interior of the roll around the pipe, of two stationary concentric pipes, the outer provided with a collar on the end inserted within the said hollow journal, said inner and outer pipes communicating with the said internal pipe and the openings, respectively, a packing-gland formed in halves longitudinally and surrounding the outer pipe, and a screw-cap engaging with a screw-threaded portion on the end of the hollow journal and forcing the packing-gland within it.

In testimony whereof I affix my signature in presence of two witnesses.

PAUL AMBROSE OLIVER.

Witnesses:
CHAS. P. HUNT,
GEO. GUNTZ.